(12) United States Patent
Oliveira

(10) Patent No.: US 7,761,876 B2
(45) Date of Patent: Jul. 20, 2010

(54) METHOD AND SYSTEM FOR BALANCING THE LOAD ON MEDIA PROCESSORS BASED UPON CPU UTILIZATION INFORMATION

(75) Inventor: Marcelo Gomes Oliveira, San Jose, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 939 days.

(21) Appl. No.: 10/393,187

(22) Filed: Mar. 20, 2003

(65) Prior Publication Data

US 2004/0186904 A1    Sep. 23, 2004

(51) Int. Cl.
*G06F 9/46* (2006.01)
*H04Q 11/00* (2006.01)

(52) U.S. Cl. .................... 718/105; 370/260

(58) Field of Classification Search ......... 718/104–105; 370/260
See application file for complete search history.

(56) References Cited

U.S. PATENT DOCUMENTS

| | | | |
|---|---|---|---|
| 5,630,129 A | 5/1997 | Wheat .................... 395/675 |
| 5,742,772 A | 4/1998 | Sreenan ............... 395/200.56 |
| 5,826,083 A | 10/1998 | Prasad .................... 395/675 |
| 5,867,494 A | 2/1999 | Krishnawyamy et al. ... 370/352 |
| 5,889,989 A * | 3/1999 | Robertazzi et al. ......... 718/105 |
| 5,898,870 A * | 4/1999 | Okuda et al. .............. 718/104 |
| 5,909,431 A | 6/1999 | Kuthyar et al. ........... 370/260 |
| 5,999,525 A | 12/1999 | Krishnaswamy et al. ... 370/352 |
| 6,006,253 A | 12/1999 | Kumar et al. ............. 709/204 |
| 6,018,360 A | 1/2000 | Stewart et al. ............. 348/15 |
| 6,081,513 A | 6/2000 | Roy ......................... 370/260 |
| 6,163,531 A | 12/2000 | Kumar ...................... 370/260 |
| 6,202,084 B1 | 3/2001 | Kumar et al. ............. 709/204 |
| 6,223,205 B1 | 4/2001 | Harchol-Balter et al. .... 709/105 |
| 6,282,561 B1 | 8/2001 | Jones et al. .............. 709/104 |
| 6,298,370 B1 | 10/2001 | Tang et al. ................ 709/102 |
| 6,324,169 B1 | 11/2001 | Roy ......................... 370/260 |
| 6,335,927 B1 | 1/2002 | Elliott et al. .............. 370/352 |
| 6,374,300 B2 | 4/2002 | Masters .................... 709/229 |
| 6,405,219 B2 | 6/2002 | Saether et al. ............ 707/201 |
| 6,424,994 B1 | 7/2002 | Pirich et al. .............. 709/205 |
| 6,442,584 B1 | 8/2002 | Kolli et al. ................ 709/104 |
| 6,457,043 B1 | 9/2002 | Kwak et al. .............. 709/204 |

(Continued)

OTHER PUBLICATIONS

Tanenbaum, Andrew S., Structured Computer Organization, 1984, Prentice-Hall, 2nd Edition, pp. 10-12.*

(Continued)

*Primary Examiner*—Meng-Ai An
*Assistant Examiner*—Eric C Wai

(57) ABSTRACT

The present invention is a method and system for balancing the load on processors based upon the CPU utilization information of the processors. Real time CPU utilization information of processors may be effectively analyzed to prevent overloading of processing resources as assigned by a multipoint controller of a VoIP network. CPU utilization information may include the number of current conferencing channels being supported by each processor, CPU speed and the quantity of other applications being supported by the media processor. CPU utilization information from each processor may be retrieved by establishing a communication protocol with each processor and periodically polling the processors in regard to their CPU load capability. Assignment of processing tasks to processors may be based on which specific processors have the capability to handle the processing task.

5 Claims, 3 Drawing Sheets

U.S. PATENT DOCUMENTS

| | | | |
|---|---|---|---|
| 6,473,802 B2 | 10/2002 | Masters | 709/229 |
| 6,744,741 B1 * | 6/2004 | Ju et al. | 370/260 |
| 2001/0005372 A1 | 6/2001 | Cave et al. | 370/401 |
| 2001/0005382 A1 | 6/2001 | Cave et al. | 370/466 |
| 2001/0037387 A1 | 11/2001 | Gilde et al. | 709/225 |
| 2001/0043608 A1 | 11/2001 | Potter et al. | 370/401 |
| 2001/0047300 A1 | 11/2001 | Takashima et al. | 705/14 |
| 2002/0015108 A1 | 2/2002 | Takashima et al. | 348/484 |
| 2002/0033880 A1 | 3/2002 | Sul et al. | 348/14.09 |
| 2002/0040400 A1 | 4/2002 | Masters | 709/228 |
| 2002/0057333 A1 | 5/2002 | Mayuzumi | 348/14.1 |
| 2002/0064149 A1 | 5/2002 | Elliott et al. | 370/352 |
| 2002/0085517 A1 | 7/2002 | Lee et al. | 370/331 |
| 2002/0089939 A1 | 7/2002 | Foti | 370/265 |
| 2002/0099854 A1 | 7/2002 | Jorgensen | 709/249 |
| 2002/0105909 A1 | 8/2002 | Flanagan et al. | 370/230 |
| 2002/0138618 A1 | 9/2002 | Szablo | 709/225 |
| 2002/0143972 A1 | 10/2002 | Christopoulos et al. | 709/231 |
| 2002/0172221 A1 | 11/2002 | Dale et al. | 370/466 |
| 2003/0005054 A1 | 1/2003 | El-Gebaly et al. | 709/204 |

OTHER PUBLICATIONS

White Paper Load Balancing, A Multifaceted Solution for Improving Server Availability; Cisco Systems, Inc.

F5 Networks: Delivering Non Agent-Based Solutions for Quality of Service, High Availability and Intelligent Load Balancing; FS Networks, Inc.; Oct. 2002.

* cited by examiner

METHOD AND SYSTEM FOR BALANCING THE LOAD ON MEDIA PROCESSORS BASED UPON CPU UTILIZATION INFORMATION

BACKGROUND OF THE INVENTION

The present invention relates generally to high capacity conferencing systems, and particularly to a method and system for balancing the load on processors based upon central processing unit (CPU) utilization information.

Efficient and cost-effective mechanisms for individuals desirous of engaging in discussions are telephone, video and data conferencing systems. Popular high capacity conferencing systems known to the art provide data transfer and voice communication across a voice over IP (VoIP) network infrastructure. A VoIP conferencing network infrastructure typically includes a multipoint conferencing unit that maintains all the audio, video, data and control streams between participants in a conference.

A multipoint conferencing unit may be decomposed into two separate logical entities: a Multipoint Controller (MC) and multiple Media Processors (MP). The multipoint controller is the conference controller and handles the requests from terminals based on the conferencing resources available at the multipoint conferencing unit. Media processors handle the media exchange including the processing, mixing and switching of audio/video/data among the terminals on a VoIP network. In this fashion, the multipoint controller requests support and leverages the resources of specific media processors to process audio/video and data to effectuate communication between terminals of the network.

As a result of increasing performance capability of personal computers, most media processor units are leaving the predictable hardware platform to become software-based media processors executed on standard personal computer platforms. A problem associated with VoIP networks utilizing multipoint controller support of software-based media processors lies in a lack of overload protection. Current multipoint controller support of software-based media processors does not include an efficient resource management mechanism. In conferencing systems known to the art, multipoint controllers only receive information concerning the number of conferences and participants in each media processor.

Due to a lack of a resource management mechanism, multipoint controllers will expand conferences on the media processors by trying to add a new participant to a conference until they receive an error code of "insufficient resources". When the media processors report an "insufficient resources" error code, the media processors are already overloaded and additional conference participants cannot be added. This does not allow the multipoint controller to take preventative actions when the media processor is running low on CPU resources. Complex corrective actions after receipt of the error code, initiated and executed by the multipoint controller, is the only response.

Consequently, it would be advantageous if a multipoint controller would know the CPU utilization information of appliances in which the processors are operating to balance the load across a plurality of processors.

SUMMARY OF THE INVENTION

Accordingly, the present invention is directed to a method and system for system and method for balancing the load on processors based upon the CPU utilization information. In an embodiment of the invention, real time CPU utilization information of appliances may be effectively analyzed to prevent overloading of processing resources as assigned by a multipoint controller of a VoIP network multipoint conferencing unit. CPU utilization information may include the overall CPU utilization percentage in addition to the number of current conferencing channels being supported by each media processor, but may also include CPU speed and the quantity of other applications being supported by the processor of each appliance. In one embodiment of the invention, a system of the invention may retrieve CPU utilization information from each processor by establishing a communication channel using any suitable protocol with each processor and periodically polling the processors in regard to their current CPU load. CPU load information may be utilized to assign processing tasks to processors that are most capable of handling the demanded processing tasks. This may maximize the conferencing resource utilization by allowing the multipoint controller to develop an adaptive resource management policy based on the data collected during the system life and may reduce the chances that complex correction actions are required.

It is to be understood that both the foregoing general description and the following detailed description are exemplary and explanatory only and are not necessarily restrictive of the invention claimed. The accompanying drawings, which are incorporated in and constitute a part of the specification, illustrate an embodiment of the invention and together with the general description, serve to explain the principles of the invention.

DETAILED DESCRIPTION OF THE SPECIFIC EMBODIMENTS

Reference will now be made in detail to the presently preferred embodiments of the invention, examples of which are illustrated in the accompanying drawings.

Figure 1:
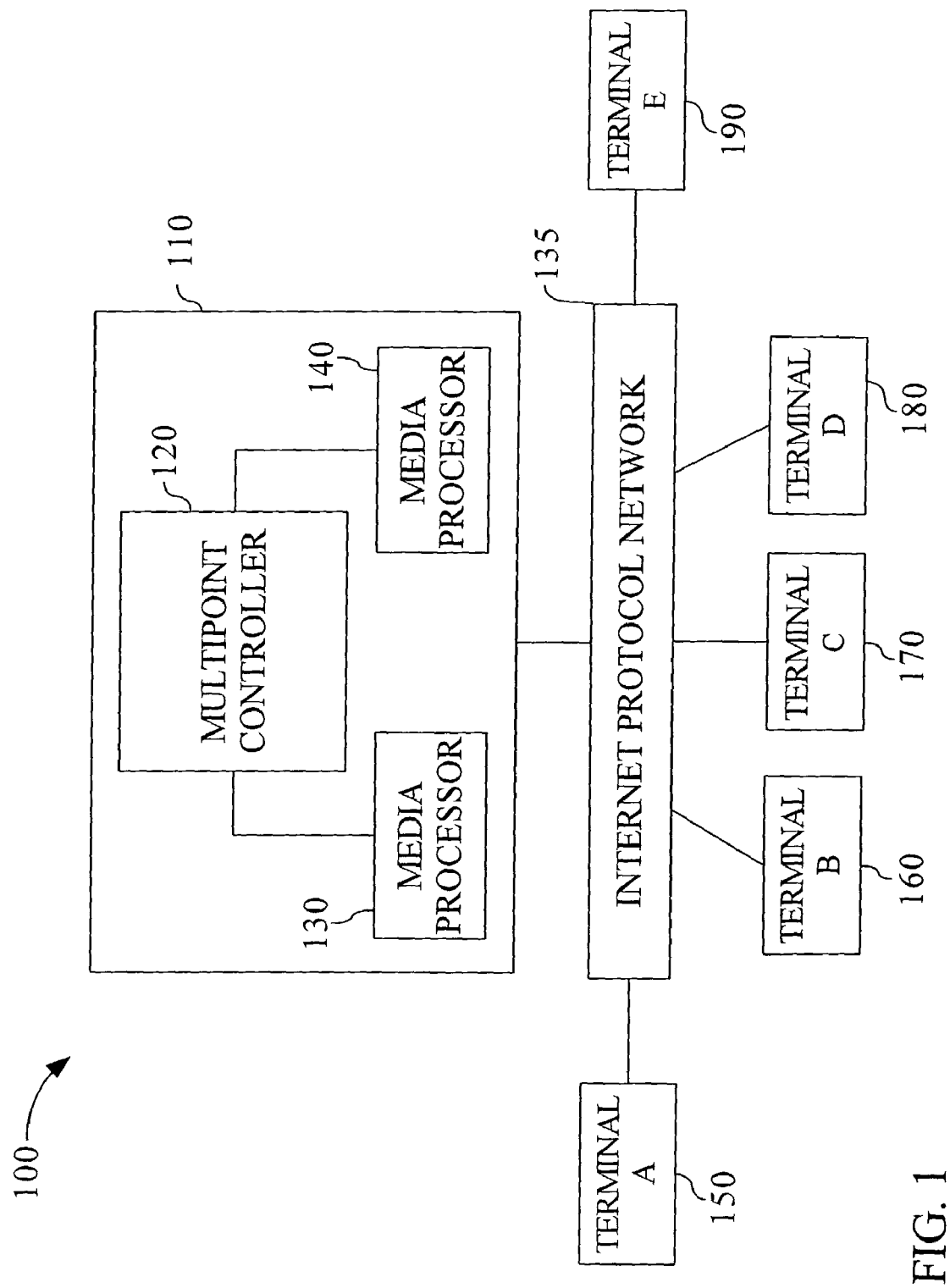
FIG. 1 is an illustration depicting an embodiment of a conferencing system of the present invention across a worldwide network.
Figure 2:
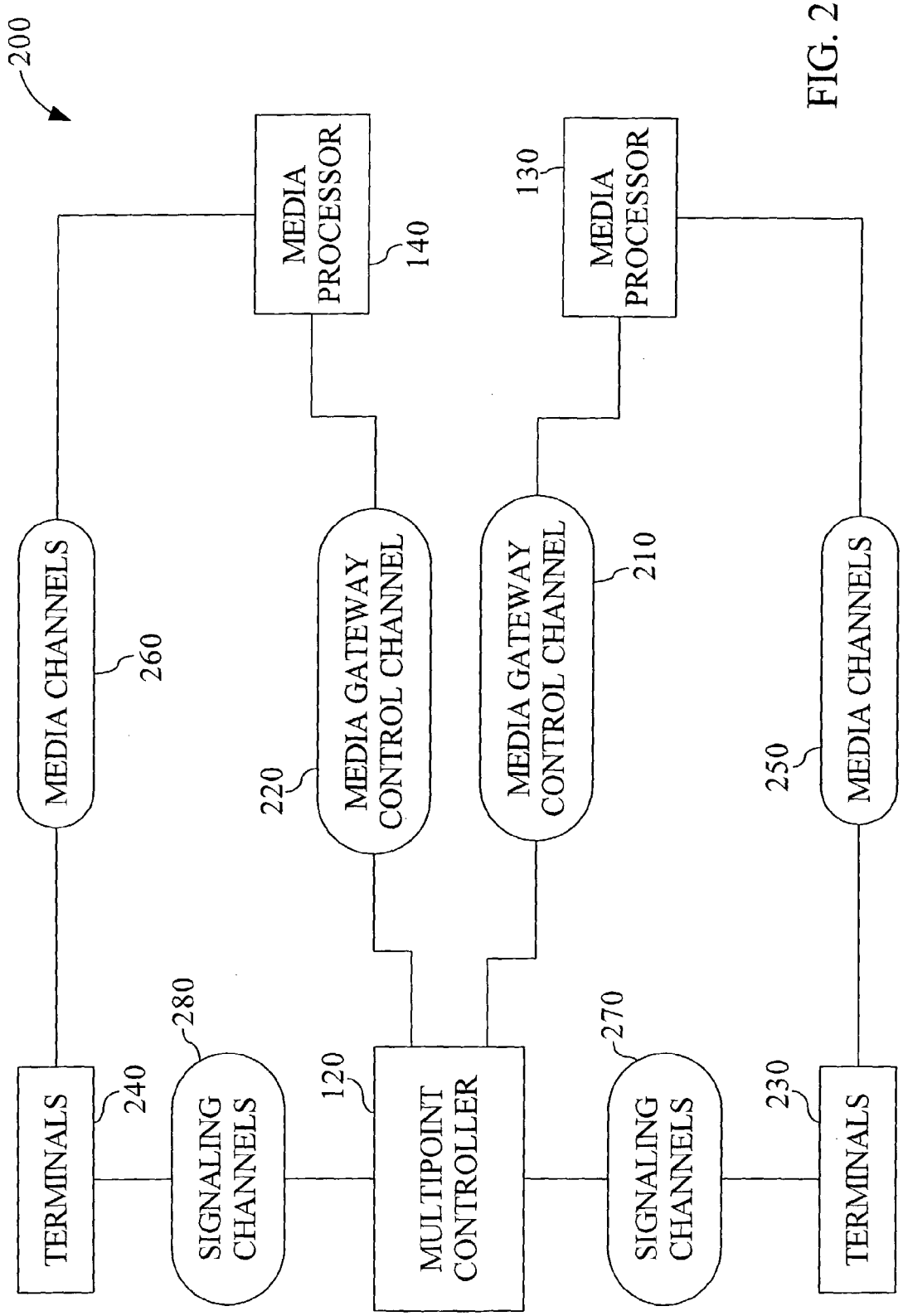
FIG. 2 is an illustration depicting an embodiment of a system for balancing the load on media processors based upon the CPU utilization information.
Figure 3:
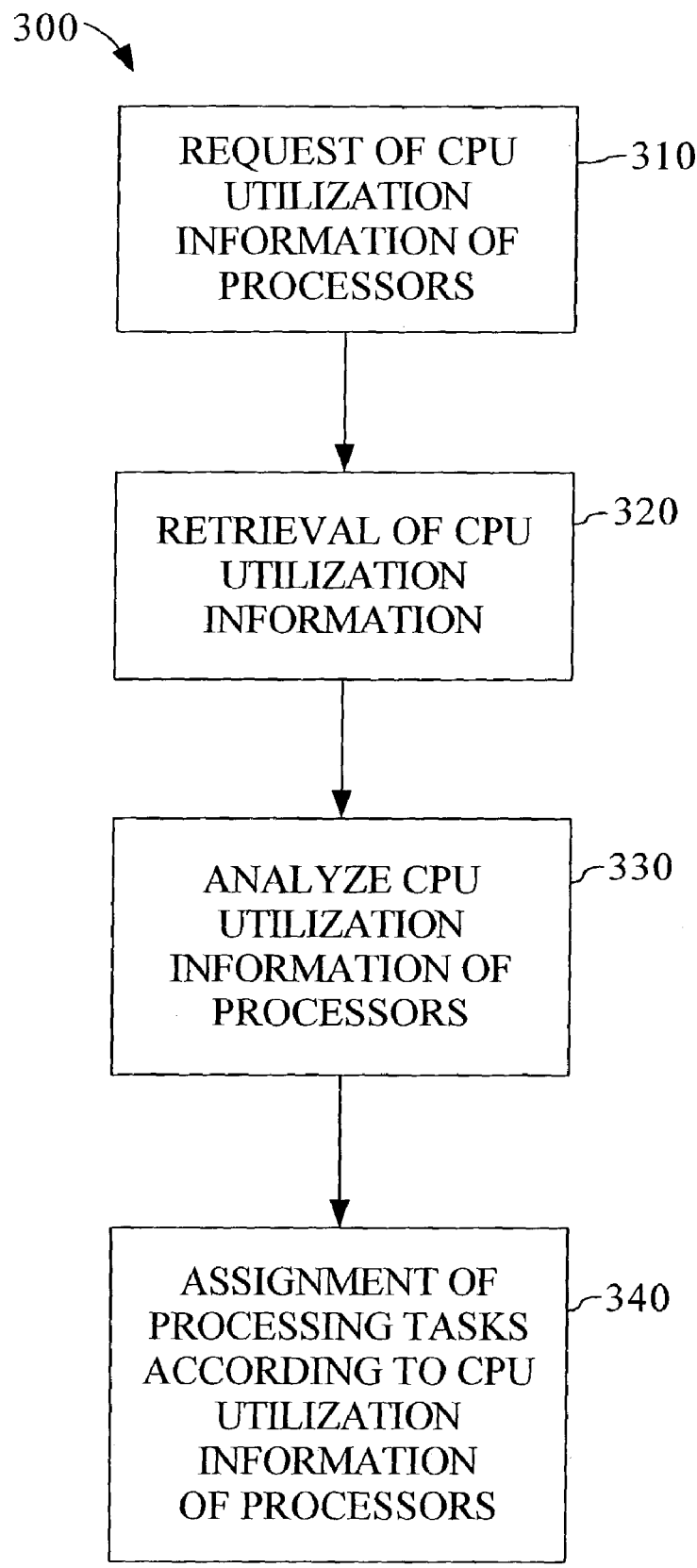
FIG. 3 is a flow diagram illustrating an exemplary method of the present invention for balancing the load on processors based upon the CPU utilization information.

Referring generally now to FIGS. 1 through 3, exemplary embodiments of the present invention are shown. According to a method and system of the present invention, CPU load information from appliances with processors handling processing tasks for a controller may report their load information to a controller. The controller, such as a multipoint controller of a VoIP conferencing system network, may retrieve the CPU capability of the processors and assign processing tasks to specific processors that are more capable of handling the processing tasks. While embodiments of the present invention depict a multipoint controller assigning tasks to software-based media processors based upon the CPU utilization information of the processors for a VoIP conferencing network, it should be understood by those with ordinary skill in the art that the method and system may be implemented in various types of systems including computing systems, data storage systems, media delivery systems and the like without departing from the spirit and intent of the invention.

Referring now to FIG. 1, an illustration depicting an embodiment of a conferencing system 100 of the present invention across a worldwide network is shown. Conferencing system 100 may be a voice over IP (VoIP) network. Conferencing system 100 may allow communication and collaborative communication between terminals 150-190 across an IP network 135. In an embodiment of the invention, conferencing system 100 may operate according to the Session Initiation Protocol (SIP) established by the Internet Engineering Task Force (IETF). In an alternative embodiment of the invention, conferencing system 100 may operate according the H.323 and H.248 protocols established by the International Telecommunications Union.

Terminals 150-190 may refer to the communications element that allows connection to conferences and provides real time, two-way voice, video or data communications with other terminals. Terminals 150-190 may include telephones, IP telephones, gateways, personal computers, cellular phones and the like.

A multipoint control unit 110 may direct, control and allow real time, two way voice, video or data communication among the terminals 150-190. The multipoint control unit 110 may include a multipoint controller 120 and media processors 130-140. A multipoint controller 120 may control the negotiations among terminals 150-190 and may request support from media processors 130-140 to handle the processing, mixing and switching of audio/video and data. Multipoint controller 120 may include a processor and memory. Memory may include a program of instructions executed by the processor to control the communication between terminals 150-190 of conferencing system 100.

Media processors 130-140 provide processing support for multipoint controller 120, however, media processors may also provide support for other types of applications. In an embodiment of the invention, media processors 130-140 may be software-based media processors executed on standard personal computer platforms. As a result, the media processors may, in addition to supporting the multipoint controller in processing of audio, video and data applications across a conferencing network, support other applications executed on a personal computer or a network server. It should be understood that the media processor 130-140 may support the applications of a variety of devices including digital information appliances, web browsers, web servers, pocket computers and the like in addition to personal computers. Additionally, while only two media processors are shown, it should be understood by those with ordinary skill in the art that any number of media processors may be implemented in accordance with the present invention. While an IP network 135 is shown, it should be understood that balancing the processing resources of a plurality of media processors may be desirable with other types of networks including integrated digital service networks (ISDN) and public switched telephone networks (PSTN).

In an embodiment of the invention, media processor 130 may support the processing associated with terminals 150-170 while media processor 140 supports the processing associated with terminals 180-190. If another conference is desired, multipoint controller 120 may request the CPU utilization information of each media processor 130-140. Based upon the CPU utilization information of each media processor 130-140, the multipoint controller 120 may select which media processor will process the tasks associated with the new conference.

Referring now to FIG. 2, an illustration depicting an embodiment of a system 200 for balancing the load on processors based upon the CPU utilization information is shown. System 200 may include a multipoint controller 120 and media processors 130-140. In an exemplary embodiment of the present invention, multipoint controller may assign additional processing tasks to media processor 130 or media processor 140 depending upon the capability of each to handle the task. For instance, if media processor 130 is operating at 40% of capacity while media processor 140 is operating at 80% of capacity, then multipoint controller 120 may assign additional tasks to media processor 130 to balance the processing load across all of the media processors 130-140. It should be understood that a plurality of media processors may support the multipoint controller and may operate similarly to media processors 130-140, two media processors being depicted only for exemplary purposes.

An example of a new processing task may be a new conference inquiry. A new conference or call may be initiated by terminals 230-240. When a call is initiated by terminals 230-240, a signal may be delivered to multipoint controller 120 across signaling channels 270-280. The request of a call from terminals 230-240 may require additional processing resources, consequently, this may cause multipoint controller 120 to request the CPU utilization information of media processors 130-140. Multipoint controller 120 may poll the media processors 130-140 via media gateway control channels 210-220 to retrieve CPU utilization information.

Media gateway control channels 210-220 may be of a communication protocol in which the multipoint controller may retrieve the CPU utilization information of the media processors 130-140. In an embodiment of the invention, media gateway control channel may operate according to H.248, also known as Megaco. It should be understood by those with ordinary skill in the art that other types of protocols may be implemented to provide session management and allow transfer of CPU utilization information without departing from the spirit and intent of the invention. Multipoint controller 120 may analyze the CPU utilization information to assign additional processing tasks to media processors 130-140.

CPU utilization information may include the number of conferences, number of participants and the type of media being used by each participant in each media processor 130-140. Additionally, CPU utilization information may include a number of media channels 250-260 supported by each media processor 130-140. Since media processors may run on standard personal computer platforms, the media processors may support additional applications of the appliance in which the processor is operating. For example, if the appliance is a personal computer, the media processor may be supporting storage applications. Consequently, the media processor may be employing processing resources for applications other than the voice and data conferencing system of FIG. 1. The CPU utilization information may include a total amount of CPU capability factoring in the processing tasks relating to the conferencing system and processing tasks relating to other applications of the appliance in which the media processor is operating.

Referring now to FIG. 3, a flow diagram illustrating an exemplary method 300 of the present invention for balancing the load of processors based upon the CPU utilization information is shown. Method 300 may be upon initiation of a request of CPU utilization information of processors 310. The request may be initiated by a controller desirous of knowing the current, real time, CPU utilization information of each processor when an additional processing task is necessary. In an alternative embodiment of the invention, a request of CPU utilization information may be performed on a periodic basis and additional requests may be performed according to a desired period. The desired period may be established as required for the type of application in which the controller is operating.

Upon the request of CPU utilization information, the current CPU utilization information may be retrieved 320. CPU utilization information may include a number of channels each processor is supporting in a conferencing network system. Additionally, CPU utilization information may include processor speed and a quantity of other processing tasks being supported by the processor at that point in time. It should be understood by those with ordinary skill in the art that various mechanisms exist for providing CPU utilization information of processors, any of which may be implemented in accordance with the present invention without departing from the spirit and intent of the invention. When CPU utilization information is produced, a controller may retrieve the information via a communication protocol in use between the controller and processors.

CPU utilization information of processors may be analyzed 330. In such a fashion, a controller, with access to CPU utilization information, may determine the capability of each processor to handle additional processing tasks. In an embodiment of the invention, analysis of the CPU utilization information may include determining whether a new processing task may be handled by a specific processor due to the amount of processing required to handle the task and the processing capability of the specific processor.

Advantageously, the assignment of processing tasks may be based according to CPU utilization information of processors 340. As a result, processors may not become overloaded and unable to handle assigned processing tasks. This may allow a more efficient execution of processing tasks due to the minimization of error conditions caused by overloading. Assignment of processing tasks may be effectuated by delegating the processing task to a single processor or a plurality of processors. In one embodiment of the invention, the processing task may be delegated to a processor with a highest amount of processing capability. Additionally, the processing task may be assigned to a processor or plurality of processors which have the capability to handle the processing task by analyzing an amount of processing required to support the task and the amount of processing capability of each processor.

In an alternative embodiment of method 300 of the present invention, the plurality of processors supporting a controller may regularly report their CPU utilization information without first receiving a request from the controller. As a result, the CPU utilization information of processor may be automatically reported and sent to a controller. Upon receipt of the CPU utilization information, a controller may delegate additional processing tasks according to the latest CPU utilization information. Additionally, the processors may be capable of providing an alert when each processor has exhausted its processing capability. If a processor is incapable of handling additional processing tasks, then an alert may be sent to the controller. This may notify the controller to delegate any additional processing tasks to other processors.

Although the invention has been described with a certain degree of particularity, it should be recognized that elements thereof may be altered by persons skilled in the art without departing from the scope and spirit of the invention. It is understood that the specific orders or hierarchies of steps in the methods illustrated are examples of exemplary approaches. Based upon design preferences, it is understood that the specific orders or hierarchies of these methods can be rearranged while remaining within the scope of the present invention. The accompanying method claims present elements of the various steps of methods in a sample order, and are not necessarily meant to be limited to the specific order or hierarchy presented.

It is believed that the scope of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method executed by a controller for balancing a load on a plurality of software-based media processors executing on a plurality of appliances, each one of the plurality of software-based media processors executing on one of the plurality of appliances, the load balancing based upon a CPU utilization information for the plurality of appliances, comprising:

establishing a communication channel with each one of the plurality of software-based media processors;

requesting said CPU utilization information of each appliance of said plurality of appliances, said requesting of said CPU utilization information occurs upon receipt of an additional processing task by said controller and said requesting of said CPU utilization information is repeated according to a periodic basis after receipt of said additional processing task, said additional processing task being a new conference inquiry;

retrieving a CPU utilization information for each appliance of the plurality of appliances, wherein the CPU utilization information includes a processing speed of each appliance, a number of media channels currently supported by each software-based media processor, a number of conferences being supported by each software-based media processor across a conferencing system and a quantity of processing tasks currently supported by each appliance of said plurality of appliances other than processing tasks related to the software-based media processor executing on the appliance;

assigning said additional processing task to a software-based media processor of said plurality of software-based media processors based upon said CPU utilization information for each appliance, and said assigning of said additional processing task includes determining an amount of processing resources necessary to execute said additional processing task; and receiving an alert when the software-based media processor of said plurality of software-based media processors is incapable of handling another processing task.

2. A system including a plurality of appliances for balancing a load on a plurality of software-based media processors, executing on the plurality of appliances, the load balancing based upon a CPU utilization information of the plurality of appliances, comprising:

a controller, said controller requests said CPU utilization information upon a receipt of an additional processing task and said controller requests said CPU utilization information on a periodic basis after receipt of said additional processing task, said additional processing task being a new conference inquiry;

the plurality of software-based media processors executing on the plurality of appliances, each one of the plurality of software-based media processors executing on one of the plurality of appliances, each of said plurality of appliances being communicatively coupled to said controller;

means for accessing said CPU utilization of each appliance of said plurality of appliances, wherein said CPU utilization of each appliance includes a processing speed of each appliance, a number of media channels currently supported by each software-based media processor, a number of conferences being supported by each software-based media processor across a conferencing system and a quantity of processing tasks currently supported by each appliance of said plurality of appliances other than processing tasks related to the software-based media processor executing on the appliance;

means for assigning said additional processing task to a specific software-based media processor of said plurality of software-based media processors according to said CPU utilization information of each appliance, said means for assigning includes means for determining an amount of processing resources necessary to execute said additional processing task; and means for receiving an alert when the specific software-based media processor of said plurality of software-based media processors is incapable of handling another processing task.

3. The system as described in claim 2, wherein said plurality of software-based media processors report said CPU utilization information when a processing capability for said plurality of software-based media processors has been exhausted.

4. A voice over Internet Protocol (VoIP) network conferencing system utilizing Session Initiation Protocol (SIP), comprising:

a multipoint controller; said multipoint controller controlling communications across said VoIP network conferencing system utilizing SIP, said multipoint controller requests CPU utilization information upon a receipt of an additional processing task and said multipoint controller requests said CPU utilization information on a periodic basis after receipt of said additional processing task;

a plurality of software-based media processors executing on a plurality of appliances, each of said plurality of software-based media processors being communicatively coupled to said multipoint controller and each one of said plurality of software-based media processors executing on one of the plurality of appliances; said plurality of software-based media processors handling processing of audio/video and data across said VoIP network conferencing system utilizing SIP; and at least one terminal operatively coupled to said multipoint controller; said at least one terminal providing a receptacle for audio/video and data input, wherein said multipoint controller receives said additional processing task, said additional processing task being a new conference inquiry, said CPU utilization information from said plurality of appliances is retrieved and said additional processing task is delegated to at least one specific software-based media processor of said plurality of software-based media processors based upon an amount of processing resources necessary to execute said additional processing task, and said CPU utilization information of said plurality of appliances, wherein said CPU utilization information includes:

a processing speed of each appliance, a number of media channels currently supported by each software-based media processor, a number of conferences being supported by each software-based media processor across said VoIP network conferencing system utilizing SIP and a quantity of processing tasks currently supported by each appliance of said plurality of appliances other than processing tasks related to the software-based media processor executing on the appliance;

each of said plurality of software-based media processors providing an alert to said multipoint controller when the at least one specific software-based media processor of said plurality of software-based media processors is incapable of handling another processing task.

5. The system as described in claim 4, wherein said plurality of software-based media processors report said CPU utilization information when a processing capability for said plurality of software-based media processors has been exhausted.

* * * * *